(12) United States Patent
Goldsack et al.

(10) Patent No.: US 6,431,796 B1
(45) Date of Patent: Aug. 13, 2002

(54) MINE BACKFILL

(75) Inventors: Douglas E. Goldsack; Allan G. Douglas, both of Sudbury; Wayne N. Lidkea, Lively; William A. Manfred, Garson, all of (CA)

(73) Assignee: Inco Limited, Toronto (CA)

( * ) Notice: Subject to any disclaimer, the term of this patent is extended or adjusted under 35 U.S.C. 154(b) by 0 days.

(21) Appl. No.: 09/596,494

(22) Filed: Jun. 19, 2000

(51) Int. Cl.[7] .............................. E02D 3/00; E02D 3/12
(52) U.S. Cl. .................... 405/267; 405/266; 405/258.1; 106/816; 106/819
(58) Field of Search ................................ 106/713, 718, 106/738, 811, 816, 817, 819; 405/266, 267, 263, 258.1

(56) References Cited

U.S. PATENT DOCUMENTS

| | | | | |
|---|---|---|---|---|
| 4,357,167 A | * | 11/1982 | Kellet et al. ................... | 106/97 |
| 4,746,249 A | * | 5/1988 | Haigh et al. ................. | 405/264 |
| 5,472,501 A | * | 12/1995 | Dåstøl ......................... | 106/823 |
| 5,976,241 A | * | 11/1999 | Kim et al. ................... | 106/718 |

FOREIGN PATENT DOCUMENTS

| | | | | |
|---|---|---|---|---|
| WO | WO-98/49115 A | * | 11/1998 | ........... C04B/28/06 |

OTHER PUBLICATIONS

R.K. McGeary, "Mechanical Packing of Spherical Particles," Journal of the American Ceramic Society, 44, 1961, pp. 513–522.

\* cited by examiner

Primary Examiner—David Bagnell
Assistant Examiner—Daniel Stephenson
(74) Attorney, Agent, or Firm—Edward A. Steen

(57) ABSTRACT

Backfill for a mine contains a main component of conventional backfill material and a flow enhancing superfine material component mixed with the main component. The superfine material component may be a clay, for example, and has a particle size of less than 1 micron. The superfine component is present in an amount of about 0.5 to 1% by weight to best achieve improved flow without plugging in a pipeline.

3 Claims, 1 Drawing Sheet

MINE BACKFILL

TECHNICAL FIELD

The instant invention relates to backfill compositions for mines in general and, more particularly, to a new and useful mine backfill that has improved flow characteristics.

BACKGROUND OF ART

In order to protect underground excavations, such as mines, from collapse, fillers are introduced into the open voids of the mine. Backfilling of mined-out cavities improves the structural integrity of the mine. Various materials have been utilized to backfill mines. Rocks, sand, tailings, grout, cement, elastomeric materials and the like, have been used as backfill with varying amounts of structural and economic success.

The most common mining practice is to backfill with hydraulic fill. Hydraulic fill is a mixture of alluvial sand and/or mill tailings and a relatively small percentage of cement. The backfill procedure typically requires large quantities of water to transport the hydraulic fill through a pipeline system to various underground locations. This large quantity of excess water reduces the hydration action of the cement in the hydraulic slurry. Furthermore, excess water containing significant quantities of cement must be drained from the solids and pumped back to the surface.

Paste fill has been developed for use as an alternate backfill procedure. With paste fill, a properly sized material may be transported by gravity or pumped underground with minimum water content in the mix. Paste backfill procedures provide distinct advantages over hydraulic fills.

Firstly, a stronger backfill is produced with an equivalent amount of binder or cement. Secondly, the clean-up and water removal problems normally associated with hydraulic fills are minimal or absent. Whereas hydraulic fill is made from a material having a sufficiently coarse size distribution, paste fills have a sufficiently fine particle component to minimize porosity and produce the "paste" characteristic.

Work by the inventors at an operating mine has shown that high-density backfill materials (>75% by weight of solid materials in a solids/water mixture) may be unable to flow in a pipeline unless the fine particular distribution of the solids component is carefully controlled. A paper by R.K. McGeary, "Mechanical Packing of Spherical Particles," *Journal of the American Ceramic Society*, 44, pp. 513–522, 1961, discloses criterion for determination of the "best" fine particle distribution for a sand mixture in terms of size ratios and composition of a 2, 3 or 4 component sand mixture. For example, a mixture of a coarse, fine and ultrafine sand mixture with size ratios of 316 to 38 to 7 requires 65% coarse, 24% fine and 11% ultrafine material to give the maximum packing factor.

Hydraulic or paste backfill in the mining industry is typically a sand mixture where the coarse material is approximately 1,000 microns in size, the fine material is 120 microns and the ultrafine material is roughly 20 microns in size. The difference between a hydraulic fill and a paste fill is the content of size 20 microns or less materials. To make a high density hydraulic fill that can bleed and therefore drain its water into the stope, the content of ultrafine material is deliberately kept to a minimum (<5% by weight of the sand mixture). For a pastefill material, however, the ultrafine content is raised to 15–20% by weight. This high content of ultrafine material provides a large surface area which can bind the water in the sand/water mixture and provide a non-bleeding paste-like material. This paste or non-bleeding material then allows for a waterless environment in the stope with the elimination of draining and water pumping required by the high density hydraulic fill materials.

High density hydraulic material has a water content in the range of 25% by weight whereas, depending on the fine particle distribution of the paste/sand materials, its water content can range from 10 to 20% by weight. For a particular paste fill material, the range is narrowed to 1 to 2%, e.g., 79 to 80% solids content, for the material to remain a paste. Too little water forms a dry mix which cannot flow; too much water yields a high density hydraulic mixture. The tight control of water content and fine particle distribution in paste materials as well as the excessive water content of the high density hydraulic material can sometimes lead to plug formation in a pipeline when good quality control on these variables is not maintained.

In addition, since the strength of a backfill mixture is controlled to a first approximation by its binder-to-water (B/W) ratio, excessive water content yields lower ultimate strengths and higher binder contents are then required in order to achieve the minimum strength targets (50, 90, 150 psi [345, 621, 1034 kPa] after 3, 7, 28 days of curing). The need for a balance between good flowability and high strength properties in these high density hydraulic or paste backfill materials and the requirement of a suitable criterion linking the fine particle distribution to these strength and flow properties of these backfill materials has led to the discovery of the principles behind this criterion for "best" fine particle distribution to achieve both high strength and flowability simultaneously. These principles form the basis of the present invention.

SUMMARY OF THE INVENTION

The mine backfill composition of the present invention includes a main component, such as a known mixture of coarse, fine and ultrafine materials in water, and a flow enhancing, superfine material component mixed with the main component. The superfine material component has a particle size of less than 1 micron and is present in an amount of about 0.3 to 1.5% by weight, or preferably 0.5 to 1% by weight, with 0.5% by weight having been found to produce the best rheology or non-plugging flow characteristics for a sodium bentonite superfine additive.

The superfine material component is a hydrophilic material that binds water and is preferably a clay, in particular, sodium bentonite.

In order to achieve good strength in a backfill sand mixture for any water content, it is necessary to have a good particle packing criterion. McGeary's paper indicates such a criterion for this purpose. Furthermore, he has indicated that introducing a small amount of a fourth component of small size to the previously described 3 component mixture resulted in a solids mixture that could flow. This observation led the present inventors to study the effect of low content (1% or less) clay-like materials on the flow and strength of typical backfill mixtures.

Previous studies revealed that for a Bingham-like material to be formed in a sand backfill mixture and to have linear flow in a backfill pipeline distribution, it is necessary that the surface area of the sand material be on the order of 1500 cm$^2$/gm. Sand mixtures with total surface area below this value do not exhibit Bingham flow and can cause phase separation between the sand and the water to occur with the resultant formation of sand plugs. The pastefill criterion of 15–25% material of size less than 20 microns has a surface area of about 500 cm$^2$/gm which is well below this minimum surface area criterion. Hence, unless a significant fraction of small material (e.g., 5 microns or smaller in size) is included in this less than 20 micron ultrafines, sand plug formation may occur when trying to cause this type of sand material to flow.

According to the present invention, a fourth component, a clay-like material, with size in the range of 1.0 to 0.1 micron and surface area of about 200,000 cm$^2$/gm (20 m$^2$/gm), is added to the backfill mixture to provide a "surface area buffer" to the mixture. For example, 1% of a sodium bentonite clay material being added to a typical sand material for backfill, which has been made for high density hydraulic mixture, will provide a surface area of 2,000 cm$^2$/gm in the total sand/water mixture. Smaller amounts of such a flow aid would be required for a paste fill material with larger amounts of ultrafines in the sand mixture (15–20% by weight) in order to achieve the surface area minimum requirement. Other alternative superfine or clay-like materials include kaolin, talc, mill tailings and slimes.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

PREFERRED EMBODIMENT OF THE INVENTION

Figure 1:
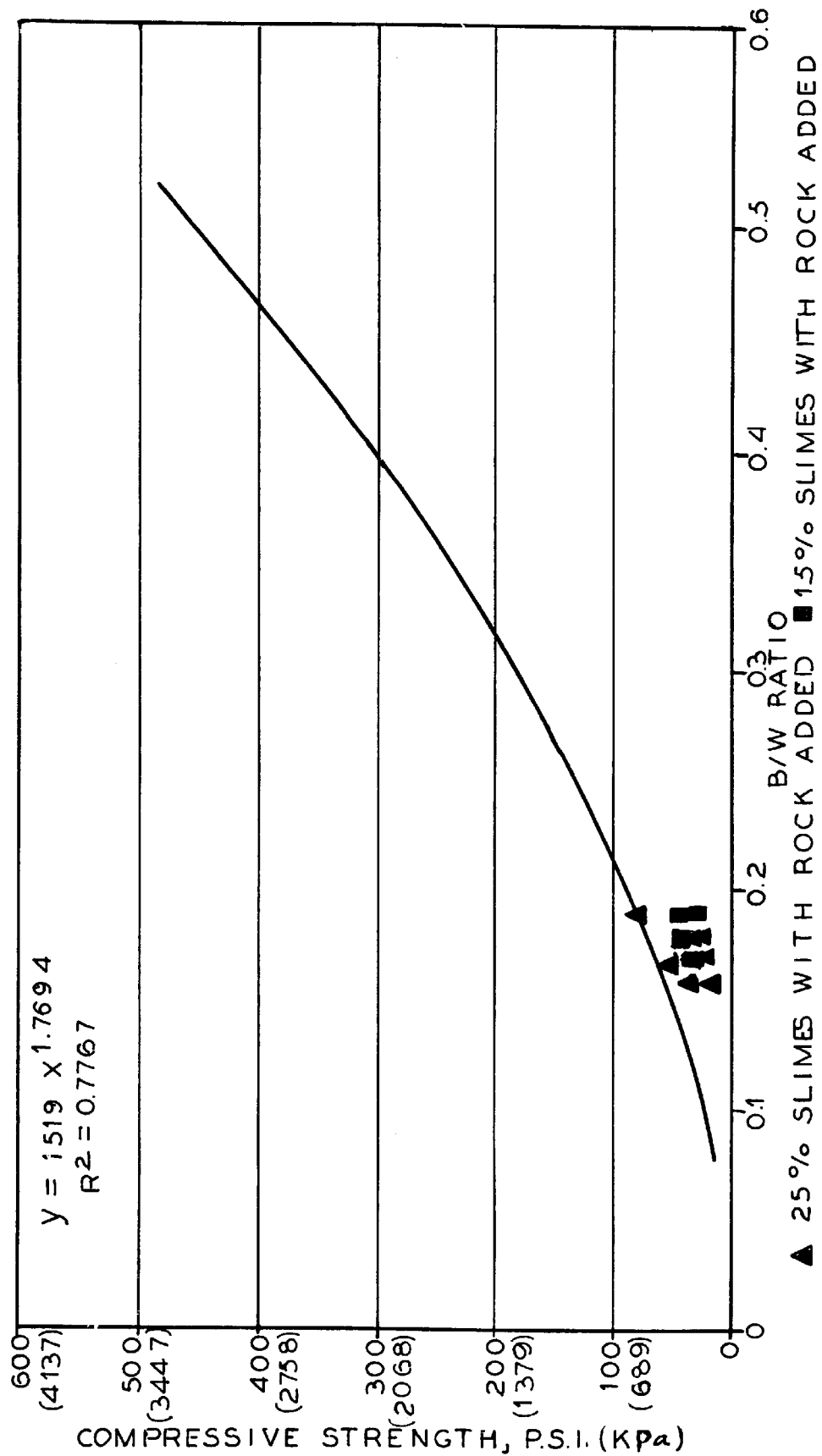
FIG. 1 is a graph plotting B/W ratio against compression strength (UCS) for a 28 day cycle and for various Inco backfill materials using OPC binder in the curve, the additional backfill data points containing 0.5% bentonite.

The addition of a clay material, particularly sodium bentonite in the 0.5 to 1.0% level, or about 0.3 to 1.5% by weight, to a typical backfill material for the mining industry, achieves Bingham flow characteristics and prevents sand plug formation in the pipeline distribution to the stope. This addition is a new step in the development of a new high density or paste backfill material that will prevent sand plug formation in pipelines.

It may be noted that although sodium bentonite is sometimes used as a flow aid in the cement industry, the difference in cement content (30% cement for normal strong 3,000 psi [20.7 Mpa] cemented material versus 3% cement content for a weak binding backfill of 150 psi [1034 KPa]) necessitates the addition of the high surface area material to the backfill in order for Bingham flow to occur. The reason for this difference is that the average size of the cement binder material is about 20 microns, which is the same size as that of the ultrafines used in the paste backfill. Hence, a paste backfill with 3% cement content is made to mimic a high cement (30% by weight cement content) as far as size and surface area is concerned. However, the cement particles are far more hydrophilic (they form a gelatinous layer on each particle) and thus act as flow aids themselves. Hence, the addition of sodium bentonite to a non-gelatinous sand mixture for a typical mine backfill material not only fulfills the surface area requirement, but it also provides the necessary gelatinous characteristics of the higher cement content materials. It is this combination of small size and high water binding characteristic of the sodium bentonite that aids in the flowability of backfill materials.

Experiments have been conducted to verify operability and usefulness of the invention.

Experiment 1

A mixture of 75% Coleman sand with the addition of 25% of an ultrafines material (Levack slimes) (20 microns in size) at 76 to 75% solids content with 5% Ordinary Portland Cement (OPC) was found not to exhibit Bingham plug flow as a binder, simple tube viscosimeter. However, the addition of 0.5% sodium bentonite to this mixture yielded a Bingham-like flowable material which did not cause plug formation.

Experiment 2

In order to increase the solids content (and decrease the water content thereby increasing the B/W ratio and the expected compressive strength of the mixture), coarse sand material up to 2,000 micron in size and up to 20% by weight was added to the above sand mixture. Without the addition of the 0.5% sodium bentonite, the material created a sand plug in the viscosimeter. The addition of 0.5% by weight sodium bentonite allowed the mixture to flow successful with Bingham-like characteristics.

Experiment 3

Measurements of the strength of the above materials at various binder to water ratios gave the same strengths in the presence and absence of the sodium bentonite flow aid within error.

A set of rheological and strength experiments were carried to test the effectiveness of sodium bentonite as a plug preventor. The data from these experiments (various of bentonite content, OPC (Ordinary Portland Cement), content, solids density, and addition of rock) are given in Tables 1–3.

These experiments showed that the addition of preferably at least 0.5% sodium bentonite to a slimes/sand mixture prevented plug formation in the sand viscometer for those mixtures, which by themselves resulted in plug formation. The sand utilized was Coleman sand with material greater than 2mm removed. Variation of the sodium bentonite content from 0.3 to 1.0% indicated that 0.5% sodium bentonite was the minimum requirement of this flow aid to prevent plug formation in the viscometer and assure a smooth flowing material.

The focus then turned to varying the binder/water content and the solids density to see the effect of these variables on the rheology and strength of these sand mixtures. From the data exhibited in Tables 1 to 3, it can be seen that the solids density ranged from 76 to 78% for paste materials with the sodium bentonite added, i.e., in the high density hydraulic range. Therefore, in order to overcome these low densities, since the material greater than 2,000 microns had been removed from the sand material, these "rock" materials were then systematically added back to the sand to make a slimes/sand/rock mixture with added sodium bentonite (fixed at 0.5%) and OPC (fixed at 5%). Strength and rheology tests were run on these mixtures and the data are given in Tables 1 to 3. Addition of this "rock" material up to 20% maximum allowed the solids density to be increased to 79% with this arbitrary sand mixture. With a better-tuned sand/slimes mixture using the McGeary criterion, this range could be extended to above 80% by weight solids density.

The strength data from these studies is displayed in FIG. 1 as small and large triangles with the background solid curve obtained from previous studies on Inco hydraulic and paste backfill. This data indicates that the addition of sodium bentonite has minimal effect on strength since the data all falls near the "standard" Inco strength versus binder to water curve.

On the other hand, without a superfine material such as bentonite being added, none of these mixes were able to flow in the viscometer without phase separation and subsequent plug formation occurring.

Experiments utilizing the new Coleman sand mix, with Coleman sand/Falconbridge tails at a 50/50 mixture, were also carried out. These experiments showed a similar pattern of rheological behavior to the above data sets. That is, addition of sodium bentonite at the 0.5% level always eliminated the plug formation that occurred when the new Coleman sand mix was made into a paste material and then flow was attempted with this paste in the sand viscometer.

TABLE 1

|  | Mix 12 | Mix 13 | Mix 14 | Mix 15 | Mix 16 | Mix 17 | Mix 18 | Mix 19 | Mix 20 | Mix 21 | Mix 22 |
|---|---|---|---|---|---|---|---|---|---|---|---|
| Solids Density | 78% | 77% | 77% | 78% | 78% | 79% | 78% | 79% | 78% | 77% | 78% |
| Percent Slimes Added | 12.50% | 12.50% | 12.50% | 12.50% | 12.50% | 12.50% | 12.50% | 12.50% | 12.50% | 12.50% | 12.50% |
| Percent OPC Added | 5% | 5% | 5% | 5% | 5% | 5% | 5% | 5% | 10% | 10% | 10% |
| Percent Bentonite Added | 0.50% | 0.50% | 0.50% | 0.50% | 0.50% | 0.50% | 0.50% | 0.50% | 0.50% | 0.50% | 0.50% |
| Percent Rock Added | 5% | 5% | 10% | 10% | 15% | 15% | 20% | 20% | 5% | 5% | 10% |
| Density of Mix (g/mL) | 1.95 | 1.89 | 1.9 | 1.92 | 1.93 | 1.98 | 1.92 | 1.96 | 1.92 | 1.88 | 1.94 |
| 28 Day UCS - psi (kPa) | 39.4 (272) | 32.3 (273) | 18.7 (129) | 34.5 (238) | 31.8 (219) | 40.1 (276) | 26.9 (185) | 30.5 (210) | 103.4 (713) | 82.2 (567) | 90.4 (623) |
| Tube Diameter | 17.3 mm | 17.3 mm | 17.3 mm | 17.3 mm | 17.3 mm | 17.3 mm | 17.3 mm | 17.3 mm | 17.3 mm | 17.3 mm | 17.3 mm |
| Tube Height | 133.4 cm | 133.4 cm | 133.4 cm | 133.4 cm | 133.4 cm | 133.4 cm | 133.4 cm | 133.4 cm | 135.9 cm | 135.9 cm | 135.9 cm |
| Flow Rate (g/sec) | 8.6 | 19.9 | 47.6 | 11.3 | 14.4 | 6.8 | 18.2 | 7.3 | 11.9 | 21.2 | 16.2 |

TABLE 2

| | 25% Slimes Added | | | | | | | | | | |
|---|---|---|---|---|---|---|---|---|---|---|---|
|  | Mix 1 | Mix 2 | Mix 3 | Mix 4 | Mix 5 | Mix 6 | Mix 7 | Mix 8 | Mix 9 | Mix 10 | Mix 11 |
| Solids Density | 76% | 77% | 76% | 77% | 78% | 76% | 77% | 78% | 77% | 78% | 79% |
| Percent Slimes Added | 25% | 25% | 25% | 25% | 25% | 25% | 25% | 25% | 25% | 25% | 25% |
| Percent OPC Added | 5% | 5% | 5% | 5% | 5% | 5% | 5% | 5% | 5% | 5% | 5% |
| Percent Bentonite Added | 0.50% | 0.50% | 0.50% | 0.50% | 0.50% | 0.50% | 0.50% | 0.50% | 0.50% | 0.50% | 0.50% |
| Percent Rock Added | 5% | 5% | 10% | 10% | 10% | 15% | 15% | 15% | 20% | 20% | 20% |
| Density of Mix (g/mL) | 1.85 | 2 | 1.87 | 1.9 | 2 | 1.85 | 1.88 | 1.98 | 1.89 | 1.91 | 1.98 |
| 28 Day UCS - psi (kPa) | 32.2 (222) | 50.1 (345) | 34.1 (235) | 22.2 (153) | 26.3 (181) | 16.3 (112) | 27.5 (190) | 33.5 (231) | 26.6 (183) | 24 (165) | 81.6 (562) |
| Tube Diameter | 17.3 mm | 17.3 mm | 17.3 mm | 17.3 mm | 17.3 mm | 17.3 mm | 17.3 mm | 17.3 mm | 17.3 mm | 17.3 mm | 17.3 mm |
| Tube Height | 132.7 cm | 133.4 cm | 133.4 cm | 133.4 cm | 133.4 cm | 133.4 cm | 133.4 cm | 133.4 cm | 133.4 cm | 133.4 cm | 133.4 cm |
| Flow Rate (g/sec) | 22.5 | 18.1 | 34.9 | 28.3 | 12 | 53.8 | 2.1 | 15.4 | 48.8 | 23.4 | 1.7 |

TABLE 3

Flow and Strength Data for New Coleman Sand and New Coleman Sand/Falco Tails Mix

|  | Mix 23 | Mix 24 | Mix 25 | Mix 26 | Mix 27 | Mix 28 |
|---|---|---|---|---|---|---|
| Solids Density | 77% | 77% | 78% | 77% | 81% | 77% |
| Percent Slimes Added | 0% | 0% | 0% | 0% | 50% | 50% |
| Percent OPC Added | 5% | 5% | 5% | 5% | 5% | 5% |
| Percent Bentonite Added | 0.50% | 0.30% | 0.30% | 0.50% | 0% | 0.30% |
| Percent Rock Added | 0% | 0% | 0% | 5% | 0% | 0% |
| Other | New Sand | New Sand | New Sand | New Sand | 50% sand/50% slimes | 50% sand/50% slimes |
| Density of Mix (g/mL) | 1.92 | 1.94 | 1.98 | 1.95 | 2.03 | 1.97 |
| 28 Day UCS - psi (kPa) | 21.7 (150) | 30.8 (216) | 38.9 (268) | 21.9 (151) | 187.9 (1296) | 57.7 (398) |
| Tube Diameter | 17.3 mm | 17.3 mm | 17.3 mm | 17.3 mm | 17.3 mm | 17.3 mm |
| Tube Height | 132.7 cm | 132.7 cm | 132.7 cm | 132.7 cm | 130.8 cm | 132.7 cm |
| Flow Rate (g/sec) | 10.4 | 95.5 | 49.9 | 16.1 | 89.7 | 46.4 |

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of other features.

What is claimed is:

1. Backfill for a mine exhibiting improved flow characteristics comprising a three part main component including course, fine and ultrafine materials, water and a fourth flow enhancing component consisting essentially of superfine sodium bentonite having a particle size of about 0.1 to 1.0 microns in an amount of about 0.3 to 1.5% weight.

2. Backfill according to claim 1 having a solids density between 76% to 81%.

3. Backfill according to claim 1 having a surface area of 2000 cm$^2$/gm.

* * * * *